(12) United States Patent
Livingood, III et al.

(10) Patent No.: US 8,496,412 B2
(45) Date of Patent: Jul. 30, 2013

(54) SYSTEM AND METHOD FOR ELIMINATING PROCESS GAS LEAK IN A SOLIDS DELIVERY SYSTEM

(75) Inventors: William Cook Livingood, III, Niskayuna, NY (US); John Saunders Stevenson, Yorba Linda, CA (US); Randy Scott Longtin, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 1281 days.

(21) Appl. No.: 11/611,399

(22) Filed: Dec. 15, 2006

(65) Prior Publication Data

US 2008/0145156 A1   Jun. 19, 2008

(51) Int. Cl.
  *B65G 53/40*   (2006.01)
(52) U.S. Cl.
  USPC .................................. 406/73; 406/14
(58) Field of Classification Search
  USPC ............. 406/10–12, 14, 34, 35, 73, 127, 197, 406/61, 30, 93; 110/104 R, 193
  See application file for complete search history.

(56) References Cited

U.S. PATENT DOCUMENTS

| | | | | |
|---|---|---|---|---|
| 2,771,323 A | * | 11/1956 | Taylor | 406/14 |
| 4,017,269 A | * | 4/1977 | Dutz et al. | 48/86 R |
| 4,059,310 A | * | 11/1977 | Waskiewicz et al. | 406/30 |
| 4,184,793 A | | 1/1980 | Blatrix | |
| 4,490,077 A | * | 12/1984 | Shimada et al. | 406/14 |
| 4,516,674 A | | 5/1985 | Firth | |
| 4,519,587 A | * | 5/1985 | Peckels et al. | 266/80 |
| 4,624,684 A | * | 11/1986 | Stevenson | 48/197 R |
| 4,679,704 A | * | 7/1987 | Dunlop et al. | 222/56 |
| 4,758,118 A | * | 7/1988 | Rachner et al. | 406/24 |
| 4,784,533 A | * | 11/1988 | Teigen | 406/14 |
| 4,801,210 A | * | 1/1989 | Gian | 366/156.2 |
| 4,988,239 A | | 1/1991 | Firth | |
| 5,048,761 A | * | 9/1991 | Kim | 241/19 |
| 5,190,068 A | * | 3/1993 | Philbin | 137/8 |
| 5,285,735 A | * | 2/1994 | Motoi et al. | 110/101 CB |
| 5,355,993 A | | 10/1994 | Hay | |
| 5,402,876 A | | 4/1995 | Hay | |

(Continued)

FOREIGN PATENT DOCUMENTS

GB        493989       10/1938
JP      58074429 A     5/1983

(Continued)

OTHER PUBLICATIONS

EP Search Report, EP 07122769, Apr. 2, 2008.

(Continued)

*Primary Examiner* — Gene Crawford
*Assistant Examiner* — William R Harp
(74) *Attorney, Agent, or Firm* — Ann M. Agosti

(57) ABSTRACT

A system for controlling gas leakage in a solids delivery system is provided. The system includes a bulk solids pump comprising an inlet for a particulate material and an outlet for discharge of said particulate material. The system also includes a buffer gas channel configured to impede backflow of process gas into the bulk solids pump, such as from a downstream system or process. The system further includes a pressure differential system configured to control a flow rate of the buffer gas and maintain a positive differential in pressure between the buffer gas and the process gas.

4 Claims, 3 Drawing Sheets

U.S. PATENT DOCUMENTS

| | | | |
|---|---|---|---|
| 5,407,305 A * | 4/1995 | Wallace | 406/14 |
| 5,497,873 A | 3/1996 | Hay | |
| 5,540,273 A * | 7/1996 | Polk et al. | 165/11.1 |
| 5,551,553 A | 9/1996 | Hay | |
| 5,584,612 A | 12/1996 | Nolan | |
| 5,657,704 A | 8/1997 | Schueler | |
| 5,813,801 A * | 9/1998 | Newbolt et al. | 406/14 |
| 6,106,202 A * | 8/2000 | Nolan | 406/95 |
| 6,213,289 B1 | 4/2001 | Hay et al. | |
| 7,402,188 B2 * | 7/2008 | Sprouse | 48/77 |
| 2005/0074302 A1 * | 4/2005 | Burnett | 406/56 |

FOREIGN PATENT DOCUMENTS

| | | |
|---|---|---|
| JP | 6016237 A | 1/1994 |
| JP | 9095744 A | 4/1997 |
| JP | 2006096530 A | 4/2006 |
| WO | 96/24810 A1 | 8/1996 |

OTHER PUBLICATIONS

Australian Patent Application No. 2007240195—Examiner's first report; Dated Apr. 19, 2012; 3 Pages.

* cited by examiner

SYSTEM AND METHOD FOR ELIMINATING PROCESS GAS LEAK IN A SOLIDS DELIVERY SYSTEM

BACKGROUND

The invention relates generally to solids delivery systems for feeding solids into pressurized systems, more specifically to solids delivery systems utilizing bulk solids pumps, such as a rotary solids pump, to feed solids to a process or system operating at elevated pressure.

A wide variety of equipment has been used to pressurize, transport and feed particulate material such as, but not limited to, solid fuels, minerals, chemicals, fillers, polymers, and other dry materials handled in solid, particle form to chemical or thermal conversion processes or other systems, such as storage systems, operating at elevated pressures. Some non-limiting examples of such equipment include lock-hoppers, screw-type feeders, piston feeders, and various combinations thereof.

Bulk solids pumps can be an attractive means for pressurizing, transporting or feeding particulate materials into such processes or systems, either alone or in combination with other such pressurizing, transporting and feeding equipment. While bulk solids pumps, offer several benefits, there still exists a potential for process gas leakage back through such pumps during operation. This is the case for instance with a rotary solids pump in which the design allows process gas originating from downstream of the rotary solids pump to leak in an opposite direction of flow of solids. The leak may pose undesirable safety and operational concerns since process gas may be sufficiently combustible, reactive, corrosive, or toxic to create hazardous conditions if it mixes with gases or the atmospheres upstream of the pump, including ambient air. The process gas that is hot or cold beyond a desirable limit may also cause damage while entering regions of the pump and upstream system that are not designed for such conditions. Further, the process gas may contain species that could condense onto the solids in an upstream equipment, reacting with the solids or wetting the solids thus causing problems including with solids flow and plugging. Even in absence of the foregoing problems, the loss of process gas back through the rotary solids pump may be undesirable for cost reasons.

Further, such gas leakage unchecked could produce instabilities in the solids flow to and in the operation of a process or system, leading to other operational, equipment, and safety issues. A malfunction in a rotary type bulk solids pump also may lead to a large and uncontrolled leak of process gas that may be combustible, reactive, corrosive or toxic. The malfunction also has safety implications due to a sudden release of stored energy in the form of a pressurized gas.

Therefore, a need exists for an improved solids delivery system that may address one or more of the problems set forth above.

BRIEF DESCRIPTION

In accordance with one aspect of the invention, a system for controlling leakage of process gas in a solids delivery system is provided. The system includes a bulk solids pump including an inlet for a particulate material and an outlet for discharge of the particulate material. The system also includes a buffer gas channel configured to impede backflow of the downstream process gas into the bulk solids pump. The system further includes a pressure differential system configured to control a flow rate of said buffer gas and maintain a positive differential in pressure between the buffer gas and the process gas.

In accordance with another aspect of the invention, a method for eliminating leakage of process gas in a solids delivery system is provided. The method includes transporting a particulate material from an inlet to an outlet via a bulk solids pump. The method also includes forming a seal of the particulate material in the outlet. The method also includes passing a buffer gas through a channel at a pressure sufficient to limit the backflow of a process gas. The method further includes sensing a flow rate of the buffer gas via a flow meter. The method also includes maintaining a positive differential in pressure between the buffer gas and the process gas via at least two pressure sensors or one differential pressure sensor.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present invention include a system for eliminating gas leak in a solids delivery system and method for the same. As used herein, the term "gas leak" refers to process gas that is leaked into the solids delivery system from a downstream process or system, or from a gas that is introduced into the solids delivery system downstream of the buffer gas such as, but not limited to, a fluidizing gas, a pneumatic conveyor carrier gas, a pressurizing gas, as one or more separate streams. The solids delivery system includes a conveyance apparatus that transports and pressurizes particulate material for a downstream process or system such as, but not limited to, a gasifier in a gasification process to produce a hot synthesis gas product. A non-limiting example of the conveyance apparatus is a bulk solids pump.

Figure 1:
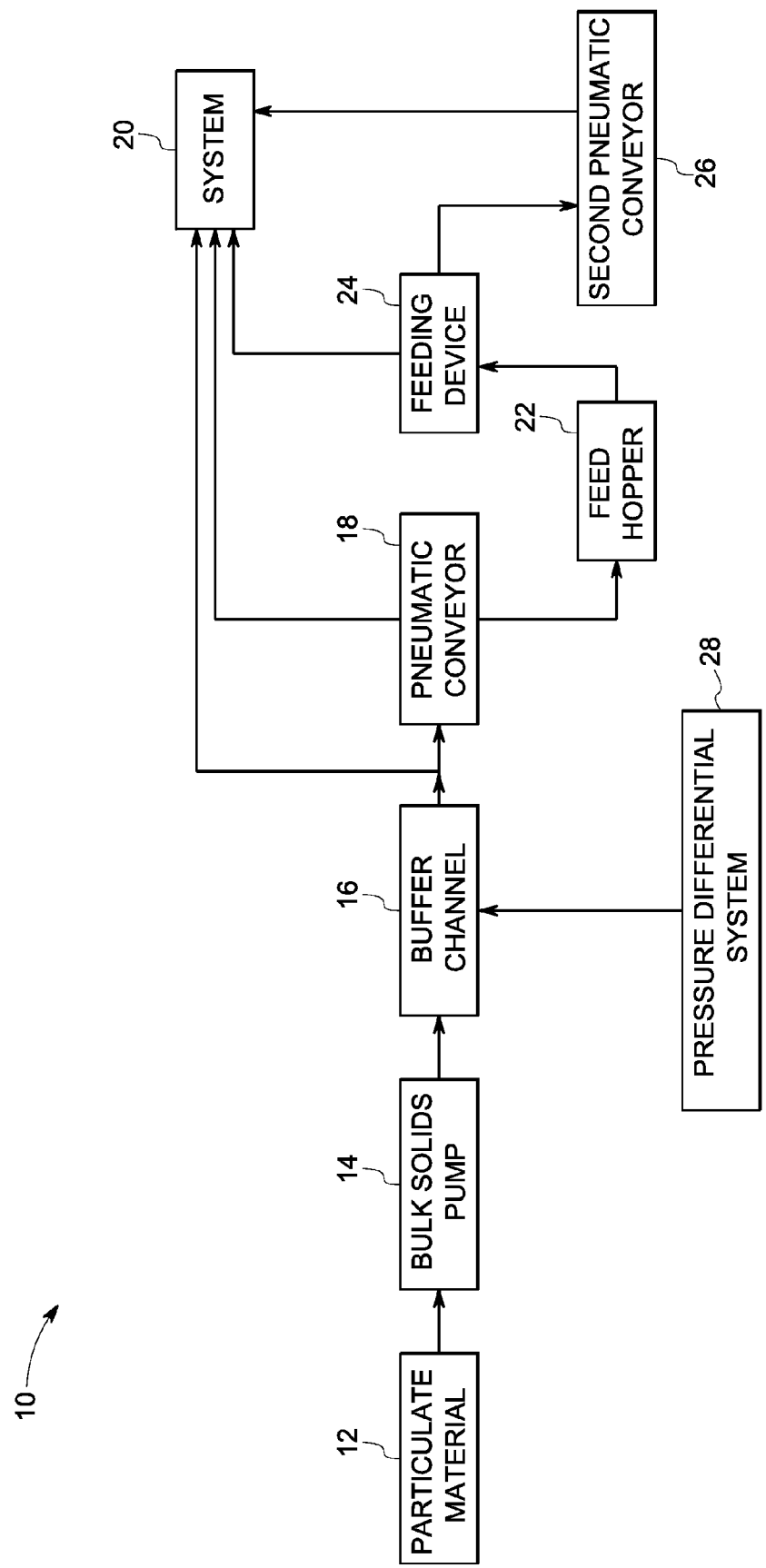
FIG. 1 is a block diagram representation of a system for eliminating gas leak in a solids delivery system in accordance with an embodiment of the invention.

FIG. 1 is a block diagram representation of a system 10 for eliminating process gas leak in a solids delivery system. The solids delivery system 10 includes a bulk solids pump 14 for handling an upstream feed of particulate material 12. In a particular embodiment, the feed of the particulate material may be via an upstream feed system (not shown). Some non-limiting examples of the upstream feed system include a feed silo, a feed hopper, a belt feeder, and combinations thereof. In another embodiment, the bulk solids pump 14 may be a rotary bulk solids pump. The particulate material 12 is transferred via the bulk solids pump 14 to an outlet for discharge and passes through a buffer gas channel 16, using a buffer gas that is of a composition whose introduction can be tolerated upstream and downstream of the bulk solids pump 14. In a particular embodiment, the buffer gas may be allowed to leak or vent to the atmosphere. Some non-limiting examples of a buffer gas include an inert gas, such as argon or helium, in the case of some processes, or nitrogen and carbon dioxide in the case of other processes. The particulate material 12 is further discharged into a pneumatic conveyor 18. The pneumatic conveyor 18 guides the particulate material 12 into a downstream process or a system 20. Some non-limiting examples of the process or system may include a solids feed gasifier for a gasification process, a pressurized blast furnace, and a reactor in a pressurized solids heat treatment process. In a particular embodiment, the particulate material 12 from the rotary solids pump 14 may be directly discharged into the system 20. In another embodiment, the particle material 12 from the bulk solids pump 14 may be conveyed by the pneumatic conveyor 18 into a feed hopper 22, which is then used in combination with one or more feeding devices 24, that may or may not be integral to the feed hopper 22, to feed a regulated amount of the particulate material 12 to the system 20. The term "feeding devices" used herein, refers to a device that physically causes the particulate material 12 to move at a specified rate. Some non-limiting examples of the feeding device may include a rotary valve, a screw feeder and a belt feeder. In yet another embodiment, the regulated amount of the particulate material 12 may be further relayed to a second pneumatic conveyor 26 for conveyance to the system 20.

The buffer gas channel 16 is coupled to a pressure differential system 28 that maintains a positive pressure differential between the buffer gas flowing and process gas from the system 20, the pneumatic conveyor 18, or the feed hopper 24. The positive pressure differential eliminates possibility of process gas being leaked into regions of the bulk solids pump 14 and systems upstream of the bulk solids pump 14 that are not designed for high or low temperature gases or combustible, reactive, corrosive, or toxic, gases. In a particular embodiment, the pressure differential system 28 may be coupled to a metering device (not shown) such as, but not limited to, a flow meter that monitors flow of the buffer gas channel. In another embodiment, the coupling is via a control system (not shown) that controls at least one of the solids delivery system 10 or the system 20.

Figure 2:
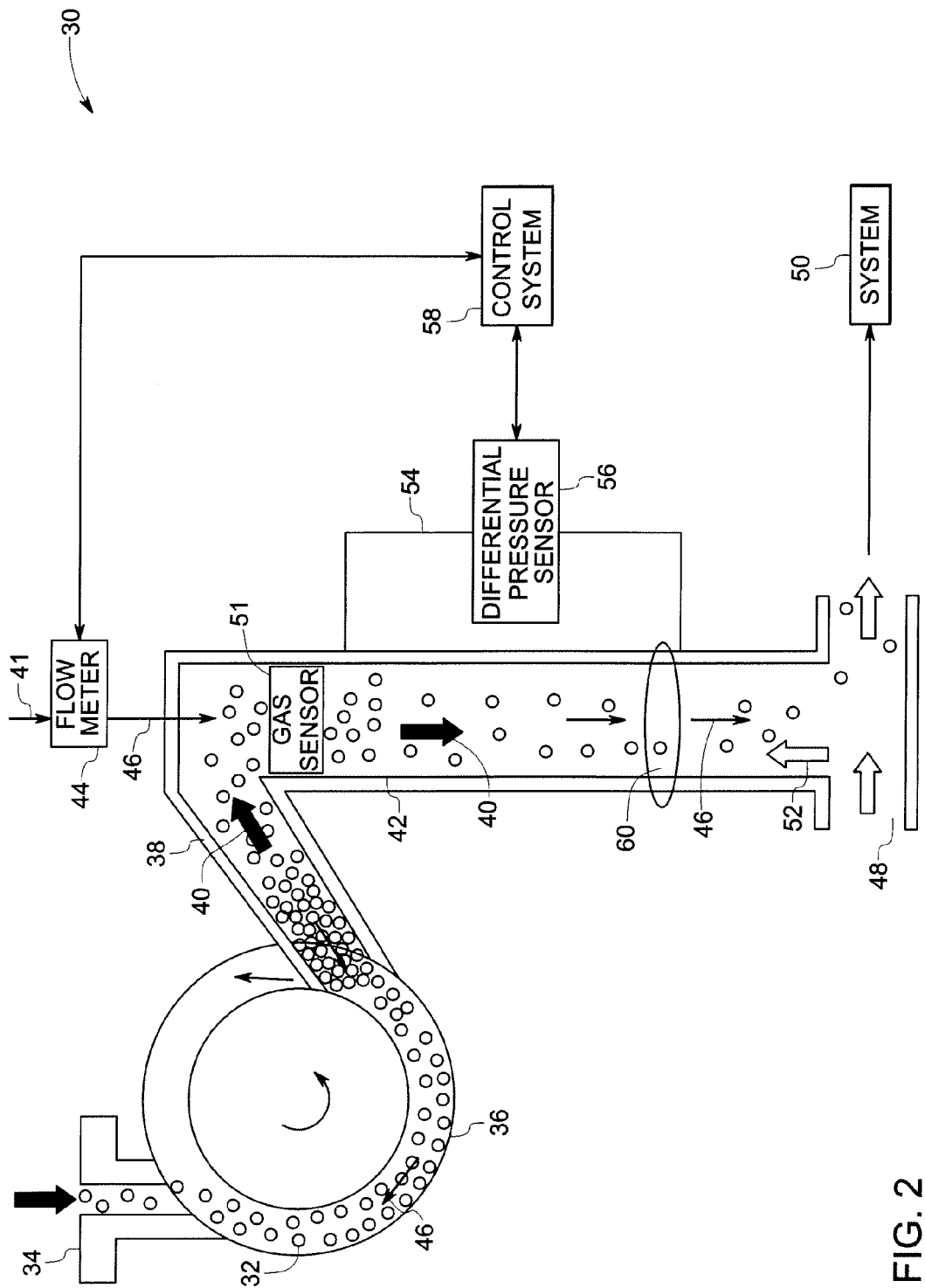
FIG. 2 is a diagrammatic illustration of the system in FIG. 1 according to an embodiment of the invention.

FIG. 2 is a diagrammatic illustration of a solids delivery system 30 that eliminates process gas leakage. The system 30 includes a rotary solids pump 36 having an inlet 34 for the introduction of particulate material 32. Some non-limiting examples of the particulate material 32 may include coal and petroleum coke. The rotary solids pump 36 transfers the particulate material 32 into an outlet 38 for discharge in a direction of solids flow 40. A seal is formed in the outlet 38 via compression of the particulate material 32 as it is pushed through the outlet 38. The particulate material 32 further passes through a buffer gas channel 42. Some non-limiting examples of a buffer gas 41 may include nitrogen, carbon dioxide, and inert gases such as, but not limited to, argon and helium. The buffer gas 41 passes through a flow meter 44 that monitors and may be used to help control the flow rate of the buffer gas in a direction 46 into the system 30. The particulate material 32 is discharged from the buffer gas channel 42 into a pneumatic conveyor 48. The pneumatic conveyor 48 includes a process gas, which transports the particulate material 32 into a system 50 for processing. Some non-limiting examples of the system 50 include a gasifier and a pressurized blast furnace. In a particular embodiment, the particulate material 32 from the rotary solids pump 36 may be directly discharged into the system 50. In another embodiment, the particle material 32 from the rotary solids pump 36 may be conveyed by the pneumatic conveyor 48 into a feed hopper (not shown), which may be further used in combination with one or more feeding devices (not shown) that may or may not be integral to the feed hopper, to feed a regulated amount of the particulate material 32 to the system 50. In yet another embodiment, the regulated amount of the particulate material 32 may be further relayed to a second pneumatic conveyor (not shown) for conveyance to the system 50. By maintaining a sufficient flow of buffer gas 41, process gas is prevented from leaking back in a direction 52 into and upstream of the rotary solids pump 36. In a particular embodiment, the flow of buffer gas 41 also prevents a gas leak from an upstream feed system at the inlet of 34 of the rotary solids pump 36. In order to take into account various effects of flow such as, but not limited to, diffusion, turbulence and size of the buffer gas channel 42, a sufficiently high positive differential between the buffer gas channel 42 and the process gas is desirable.

The buffer gas channel 42 is coupled to a pressure differential system 54 that is configured to control the flow rate of the buffer gas and maintain the sufficiently high positive differential in pressure between the buffer gas 42 and the process gas, preventing the flow of process gas in the direction 52. By maintaining a sufficiently high positive differential in pressure, the backflow of the process gas back into and upstream of the rotary solids pump 36 is eliminated. Further, the pressure differential system 54 helps avoid introducing an excessive quantity of buffer gas that may require the use of larger equipment and also increase the amount of one or more reactants required in the system 50. The pressure differential system 54 typically includes at least two pressure sensors or a differential pressure sensor 56 that monitors pressure differential at various locations in the system 30. In a particular embodiment, at least one differential pressure sensor 56 is used to measure difference in pressure between the inlet 34 and the outlet 38 of the rotary solids pump 36. In another embodiment, at least one differential pressure sensor 56 is used to measure the difference in pressure between the outlet 38 and an inlet of the pneumatic conveyor 48. In yet another embodiment, at least one differential pressure sensor 56 is used to measure difference in pressure between the outlet 38 and an inlet of the system 50. In a particular embodiment, the pressure sensors or the differential pressure sensors 56, and the flow meters 44 used in portions of the solids delivery system 30 exposed to the particulate material 32 include design elements that maximize reliability by limiting the potential for plugging and erosion from the particulate material 32. In an exemplary embodiment, the design elements include pressure sensors that connect to the process through diaphragm type seals, and purged connections. In another embodiment, the design element may include a non-intrusive flow meter, such as, but not limited to, a Coriolis flow meter. In yet another embodiment, the buffer gas may be removed entirely or partially and optionally recovered through a vent that may be located in the rotary solids pump 36, between the rotary pump 36 and the buffer gas channel 42, or upstream of the pump 36, such as from a feed vessel above the inlet of the rotary solids pump 36.

Some non-limiting examples of the process gas, such as in the case of a gasification process, may include recycled synthesis gas or recycled carbon dioxide, at least one of carbon monoxide, carbon dioxide, hydrogen, or nitrogen, or mixtures thereof, containing one or more contaminants, non-limiting examples of which include a sulfide compound, such as hydrogen sulfide, carbon monoxide, hydrogen, and methane. The process gas also may include, but is not limited to, carrier gas in the pneumatic conveyor 48 and process gas from the system 50. In a particular embodiment, the system 30 may also include a gas sensor 51 located in or upstream of the rotary solids pump 36 that detects presence of a specific compound in the process gas as a means of detecting leakage. In another embodiment, the buffer gas channel 40 may be coupled to the rotary solids pump 36 near the outlet 38 of the rotary solids pump 36. Various embodiments of the rotary solids pump 36 may be used to create an imperfect pressure barrier at the outlet 38 via an interlock of the particulate material 32, that may be used in combination with a buffer gas, to assure that the process gas does not enter the rotary solids pump 36. The details of design of a suitable rotary solids pump 36 can be found in U.S. Pat. Nos. 5,402,876, 5,355,993, and 5,551,553 which are incorporated herein by reference.

In a particular embodiment, the pressure differential system 54 may also be used to trigger an operator alarm and serve as part of a process safety interlock in case of a malfunction. The pressure differential system 54 includes or may be a part of a control system 58 that is configured to trigger an alarm during malfunction. When the pressure differential drops below an acceptable limit, the control system 58 alerts an operator via an operator alarm. The acceptable limit varies according to overall design of the system 30. In another embodiment, if the pressure differential system 54 indicates that amount of flow of buffer gas 41 is not sufficient to allow safe operation, the control system 58 performs an automated shutdown of the pump, the process or both. In yet another embodiment, if the pressure differential system 52 indicates a reverse flow of direction of the buffer gas 41, the control system 58 may perform an automated shutdown. In another exemplary embodiment, the system 30 may include an isolation valve at the inlet 34 of the rotary solids pump 36 and an isolation valve at a location 60 between the outlet 38 of the rotary solids pump 36 and the inlet of the pneumatic conveyor 48 to perform a safe and controlled shutdown.

In addition to a controlled process gas leakage during normal operation, a large uncontrolled leak may also result from a rotary solids pump malfunction. The large leak may introduce extensive amounts of combustible, reactive, corrosive, toxic and hot or cold process gas into a region not designed for such conditions. Some non-limiting examples of the region include the rotary solids pump 36 and an inlet of the pneumatic conveyor 48, a feed injector for the system 50, and equipment upstream of the rotary solids pump 36. In such a condition, the control system 58 may perform an automated shutdown. Further, one or both of the isolation valves may be closed to enable flow restriction to a backward flow of the process gas. Since the one or both of the isolation valves may not be closed fast enough or desirably to completely stop the backward flow of the process gas, the control system 58 may rapidly increase the flow rate of the buffer gas 41 in order to help minimize the amount of process gas that flows backward to and through the isolation valves and the rotary solids pump 36, as well as reduce the concentration of combustible, reactive, corrosive and toxic process gas within the system 30.

In a particular embodiment, the pressure of the buffer gas 41 supply is maintained at a minimum level above a discharge pressure of the rotary solids pump 36 and pressure of the system 50 to ensure an adequate supply. However, if the pressure of supply of the buffer gas 41 drops below a critical limit, an alarm might be activated. In another embodiment, the composition of gas in a vessel, pipe or a piece of equipment upstream (not shown) of the rotary solids pump 36, such as, but not limited to, a feed silo, a feed hopper and a belt feeder, feeding particulate material into the inlet 34 of the rotary solids pump 36 is monitored for components specific to the process gas The monitoring may enable detection of a leak of process gas into that vessel, pipe, or piece of equipment. In yet another embodiment, an alarm point for the flow rate of the buffer gas 41 is set to a maximum level. In a non-limiting example, the maximum level is set to about 5% of the flow rate of the carrier gas in the pneumatic conveyor 48. An alarm may be triggered in case the flow rate of the buffer gas 41 exceeds the limit. In another exemplary embodiment, an alarm is triggered if the buffer gas flow rate goes below a minimum flow rate. In yet another embodiment, the buffer gas flow rate is maintained above a minimum flow rate. In another embodiment, control and alarm set points for the buffer gas flow are adjusted based on the throughput of the pump. In another specific embodiment, pressure in the silo (not shown) is monitored and controlled so as to avoid over pressurizing the silo. In another embodiment, maximum pressure limits may be set for the rotary solids pump 36 or the piping downstream of the rotary solids pump 36. In an exemplary embodiment, the control system 58 may also be configured to modify the flow rate of the buffer gas 41 based on the differential pressure sensed by the differential pressure sensor 56.

In an exemplary embodiment, the pressure of a piece of equipment upstream feeding the rotary solids pump 36 is controlled and a flow rate of gas thereby vented is measured together with the change in volume of the particulate material 32 within the piece of equipment, and other gas feed flow rates to the piece of equipment to determine a net backflow of the gas through the rotary solids pump 36. In another exemplary embodiment, inerting or purge gas is used to maintain the equipment upstream feeding the rotary solids pump 36 under a safe condition, and the flow rate of the purging or inert gas together with the change in volume of the particulate material 32 inside the piece of equipment is subtracted from the net flow of gas vented from the equipment under a pressure control to determine the net backflow of gas through the rotary solids pump 36. In still another exemplary embodiment, the net backflow of gas through the rotary solids pump 36 is compared to the buffer gas feed rate to determine the net flow of buffer gas flowing downstream in the direction 46.

Figure 3:
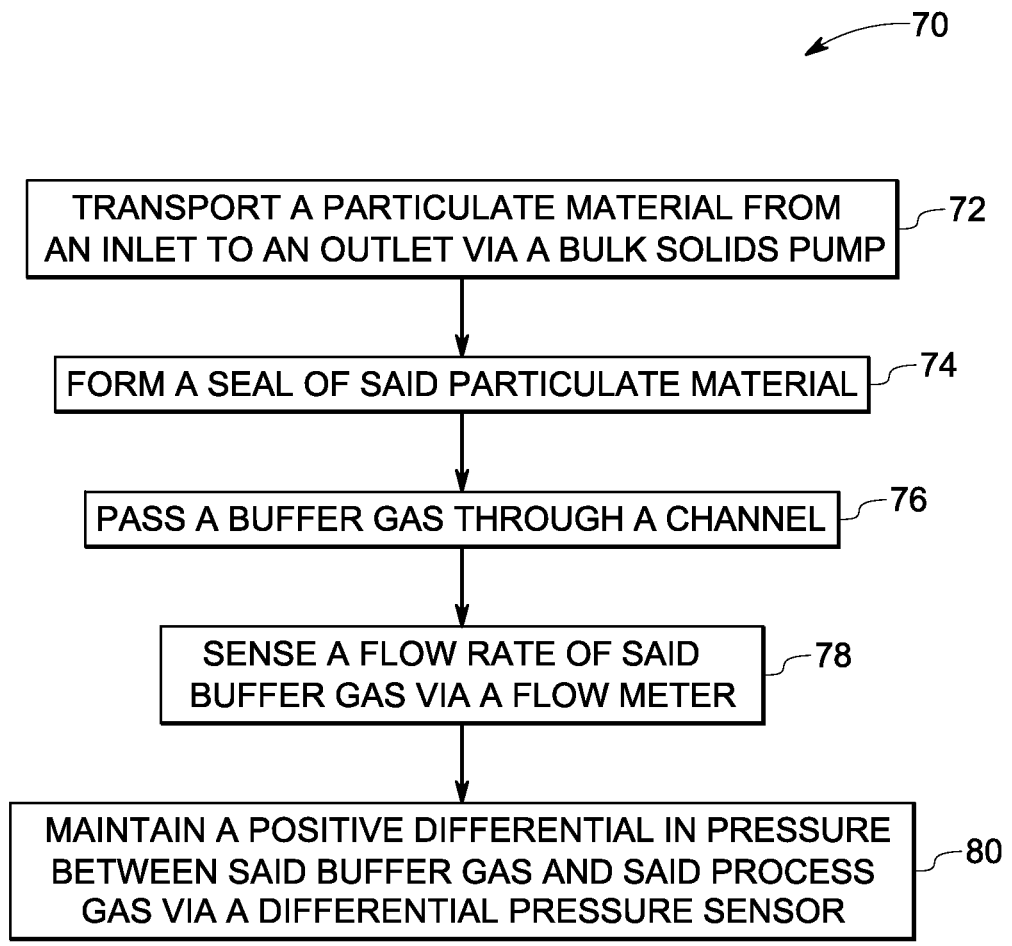
FIG. 3 is a flow chart illustrating exemplary steps in a method for eliminating gas leak in a solids delivery system in accordance with an embodiment of the invention.

FIG. 3 is a flow chart representing exemplary steps in a method 70 for eliminating gas leakage in a solids delivery system. The method 70 includes transporting a particulate material from an inlet to an outlet via a rotary solids pump in step 72. A seal of the particulate material is formed at the outlet of the rotary solids pump in step 74 due to compression of the particulate material as it is pushed through the outlet of the rotary solids pump. A buffer gas is passed through a channel at a pressure sufficient to limit a backflow of a process gas in step 76. A flow rate of the buffer gas is sensed via a flow meter in step 78. A positive differential in pressure between the buffer gas and the process gas is maintained via a differential pressure sensor in step 80. In a particular embodiment, the method 70 may also include an alarm that is triggered by a control system under conditions that are indicative of a potential pending malfunction. The control system may further shut down the solids delivery system upon triggering of the alarm or one or more additional alarms that indicate correspondingly more severe conditions or the actual malfunction. In another embodiment, the method 70 may also include sensing a specific compound in the process gas via a gas sensor located in or upstream of the buffer gas channel.

Beneficially, the above described system and method for eliminating process gas leak may be applicable to number of bulk solids pumps used with a variety solids feed processes that operate at elevated pressure. Some non-limiting examples include a gasification process, a pressurized blast furnace, and a pressurized solids thermal treatment process.

While only certain features of the invention have been illustrated and described herein, modifications and changes will occur to those skilled in the art. It is, therefore, to be understood that the appended claims are intended to cover all such modifications and changes as fall within the true spirit of the invention.

The invention claimed is:

1. A method for eliminating leakage of process gas in a solids delivery system comprising:
    transporting a particulate material from an inlet to an outlet via a bulk solids pump;
    forming a seal of said particulate material in said outlet;
    passing a buffer gas through a channel at a pressure sufficient to limit a backflow of said process gas;
    sensing a flow rate of said buffer gas via a flow meter; and
    maintaining a positive differential in pressure between said buffer gas and said process gas via at least two pressure sensors or one differential pressure sensor.

2. The method of claim 1, further comprising triggering one or more alarms during a malfunction via a control system.

3. The method of claim 1, further comprising shutting down said solids delivery system upon triggering of one or more alarms.

4. The method of claim 1, further comprising sensing a specific compound in said process gas via a gas sensor located in or upstream of the buffer gas channel.

* * * * *